No. 737,927. PATENTED SEPT. 1, 1903.
A. W. HERBERT & W. F. WASHBURN.
HOOK AND EYE.
APPLICATION FILED OCT. 1, 1902.

NO MODEL.

WITNESSES:
Edward Thorpe.
Walton Harrison

INVENTORS
Arthur W. Herbert
William F. Washburn
BY

ATTORNEYS.

No. 737,927.

Patented September 1, 1903.

UNITED STATES PATENT OFFICE.

ARTHUR W. HERBERT AND WILLIAM F. WASHBURN, OF NEW YORK, N. Y.

HOOK AND EYE.

SPECIFICATION forming part of Letters Patent No. 737,927, dated September 1, 1903.

Application filed October 1, 1902. Serial No. 125,479. (No model.)

*To all whom it may concern:*

Be it known that we, ARTHUR W. HERBERT and WILLIAM F. WASHBURN, both citizens of the United States, and residents of the city of New York, borough of Manhattan, in the county and State of New York, have invented new and useful Improvements in Hooks and Eyes, of which the following is a full, clear, and exact description.

Our invention relates to hooks and eyes, our object more particularly being to produce an exceedingly flat hook and eye capable of general use, affording a secure grip and admitting of a cheap and simple construction.

Our hooks and eyes are paired in the usual manner, and each hook and each eye is made of a thin plate of metal, and preferably by stamping.

Reference is to be had to the accompanying drawings, forming a part of this specification, in which similar characters of reference indicate corresponding parts in all the figures.

Figure 1:
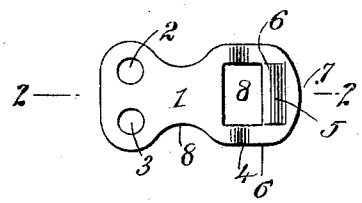
Figure 3:
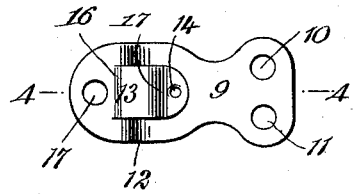
Figure 2:
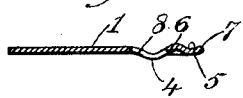
Figure 4:
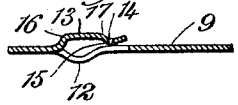
Figure 5:
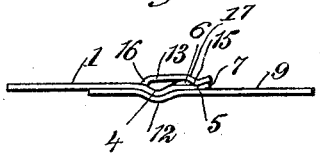

Figure 1 is a plan view of the eye. Fig. 2 is a section upon the line 2 2 of Fig. 1. Fig. 3 is a plan view of the hook. Fig. 4 is a section upon the line 4 4 of Fig. 3. Fig. 5 is a side elevation showing the hook and eye connected, and Fig. 6 is a central section analogous to Figs. 2 and 4 and showing the hook and eye connected.

The eye consists of a flat plate of spring metal 1, provided with holes 2 3, whereby the same is secured upon a surface, and also provided with a transverse crease 4, interrupted centrally by a rectangular aperture 8. Parallel with the aperture 8 and of the same length thereof is a raised bead 6. The end portion or lip 7 of the plate 1 is slightly upturned, forming a shallow crease 5 between the bead 6 and end of lip 7, as shown in Fig. 2. The bead 6 therefore presents a convex surface disposed intermediate of the two concave surfaces presented by the creases 4 5.

The hook consists of a plate 9, of sheet metal, provided with holes 10 11 17, whereby the same may be secured upon a surface substantially in like manner as the eye, and is provided with a lip 13, preferably formed integrally therewith, as shown, by stamping it from the plate and with a transverse crease 12, interrupted centrally by the opening formed by stamping up the lip. The lip 13 is formed with shoulders 16 and 17 and has its end bent upwardly beyond the shoulder 17. Between the bent upper end of the lip and the shoulders thereof and at the center of the same a hole 14 is made, and on the inner surface of the lip a bead 15 of substantially annular form encircles the hole 14 and forms a boundary therefor. At the time when the hook is stamped the shoulder 16 is formed and the hole 14 is punched, the wall of the bead 15 being raised by the act of punching the hole 14.

Figure 6:
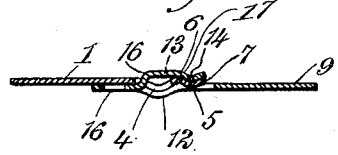
Figure 6:

To engage the hook and eye, the lip 13 of the hook is passed through the aperture 8 of the eye, when the parts will spring into interlocking engagement, as shown in Figs. 5 and 6. When the parts are thus engaged, the crease 4 of the eye fits in the crease 12 of the hook, the bead 6 of the eye engages the shoulder 17 of the lip 13, and the bead 15 of the lip engages the crease 5 of the hook. It will thus be seen that the hook and eye engage each other with a positive and strong grip without interfering with the substantial flatness of the device as a whole.

Having thus described our invention, we claim as new and desire to secure by Letters Patent—

1. A hook and eye, comprising a pair of plates of sheet material having means for fastening the same upon surfaces, one of said plates being provided with an aperture, and with a bead immediately adjacent to said aperture, said plate being also provided with a crease adjacent to the bead, the other of said plates being provided with a lip for engaging the aperture and bead of the first-named plate, said lip being provided with an annular bead for engaging the crease of the said first-named plate.

2. A hook and eye, comprising a pair of plates of sheet material having means for fastening the same upon surfaces, one of said plates being provided with an aperture and with two longitudinal creases disposed across said plate, the other of said plates being provided with a lip and crease for respectively engaging the aperture and one of the creases of the first-named plate, said lip being provided with a raised bead of annular form for engaging the other crease of the first plate.

3. A hook and eye, comprising a pair of plates of sheet material having means for fastening the same upon surfaces, one of said plates being provided with a rectangular aperture and with a crease, said crease being disposed in a general direction crossing said plate and interrupted by said aperture, said plate being also provided with a bead disposed parallel with one of the edges of said aperture and with a crease adjacent to said bead, the other of said plates being provided with a lip stamped therefrom and with a crease disposed crosswise of the plate and interrupted by the opening formed by the stamping of the lip, said crease engaging the crease of the first plate interrupted by the aperture thereof, said lip being provided with a shoulder near its free end and with a raised bead of annular form for snapping into the crease of the first plate adjacent to the bead thereof.

In testimony whereof we have signed our names to this specification in the presence of two subscribing witnesses.

ARTHUR W. HERBERT.
WILLIAM F. WASHBURN.

Witnesses:
WALTER E. WASHBURN,
FRED SCHRÖTER.